United States Patent Office 3,329,321
Patented July 4, 1967

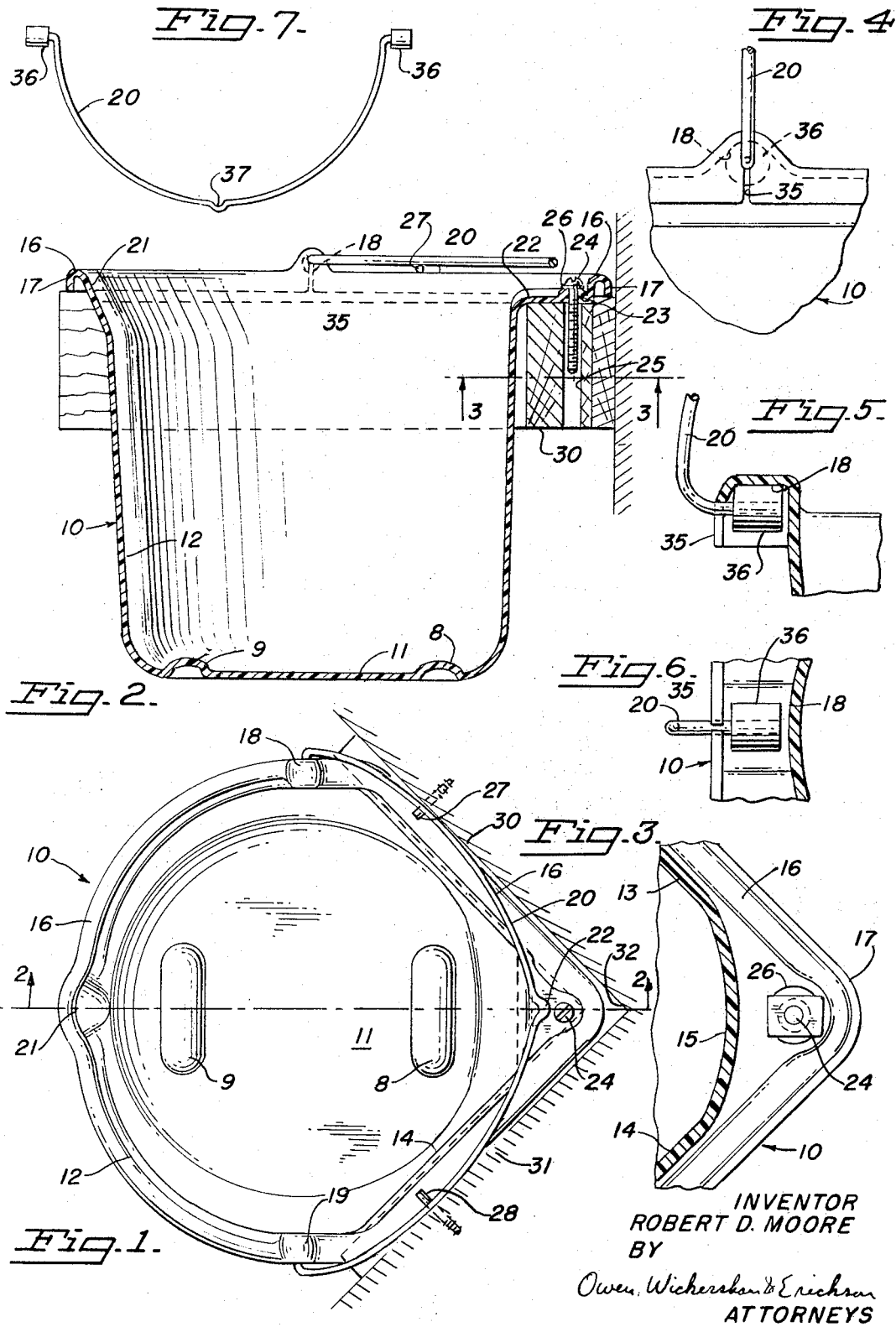

3,329,321
PLASTIC PAIL
Robert D. Moore, Los Angeles, Calif., assignor to Carnation Company, Los Angeles, Calif., a corporation of Delaware
Filed Mar. 21, 1966, Ser. No. 536,008
11 Claims. (Cl. 222—465)

ABSTRACT OF THE DISCLOSURE

A pail having a semi-cylindrical section connected to a triangular section formed by mutually perpendicular walls. The volumes of each section are substantially equal and the triangular shape provides for a secure fit in a corner. Each section is provided with a pouring spout and the bottom is formed with finger recesses as an aid to pouring from the spouts.

---

This invention relates to an improved plastic pail or bucket particularly useful for watering horses and other livestock and for feeding calves, cattle, ponies, foals, horses, and sheep.

Most horses and other livestock are currently watered from large round rubber or metal pails, and the horses have been very rough on this type of equipment. One horseman in Kansas City reported that in about 10 weeks his horses damaged a rubber pail beyond further use, due to biting and chewing on it, so that it then had to be discarded. They not only chewed the rubber pail but pulled out the grommets or eye hooks that were used to attach the bail or handle. Metal pails fared little better; they soon were heavily dented and, when dented, became very difficult to clean and had dangerous sharp edges.

These round pails have heretofore been hung on hooks from the side of the stall or set into a box. A box was quite inconvenient, and when hung from the side of the stall, the bucket constantly rattled or came loose, and soon it was either dented or split. The pails have tended to frighten the horses (or foals or other livestock) because of the odd noises they made, particularly when the horses knocked them down or got them loose. When they broke or got badly bent, jagged edges were formed which sometimes injured the horses. Moreover, the hooks on which the bucket was hung were dangerous in themselves.

Also it was inconvenient to service the stalls with the prior-art buckets, which normally had to be carried one in each hand—only two at a time—and usually had to be carried long distances to fill them, because it was inconvenient to bring hoses into the stall for this purpose. This problem is particularly evident in veal-calf feeding, where many buckets or pails of milk or milk substitute are fed to large groups of calves. Also, when feeding calves, the time of installation of the bucket is significant and was often a problem.

When transporting horses or other livestock in trailers, it has been very difficult to provide water that would remain in a position where the horse could drink it without spilling it all out. Also, prior-art pails and buckets took up an excessive amount of space, due largely to their round shape.

One object of the present invention is to provide an improved pail made from a suitable plastic and having a shape that enables it to solve the preceding problem and not only to add to the longevity of the pail but also to provide a pail that is convenient for both the animals and the people that handle it.

Another object of the invention is to provide a pail which consumes less stall or trailer space. For example, a veal calf is typically confined to an area only about 22″ x 54″, so that little space is available for a pail. The present invention provides a pail that holds an adequate volume but takes up little space.

Another object of the invention is to provide a pail which can be installed flush to the wall in the corner of the stall for easy withdrawal and for superior convenience both to the horse (or other animal) and the owner.

Another object is to provide a corner-mounting non-metal pail for feeding veal-calves, for when calves lick metal (and they tend to lick any iron or metal surface), the flesh is darkened.

Another object of the invention is to provide a pail which is balanced about the bail or handle in such a manner that it becomes quite convenient to carry two buckets in each hand and still have the liquid level even.

Another object of the invention is to provide a superior mounting means for the pail, so that there are no hooks and no piece of metal inside to catch on the animal's head or in the instance of horses, his bridle, thereby avoiding injury to the animal. A related object is to enable rapid removal and installation of the pail.

Another object is to eliminate the usual noise attendant with metal pails and so to avoid frightening livestock.

Another object of the invention is to provide a pail or bucket which is especially useful when transporting horses or calves or other livestock by trailer.

Other objects and advantages of the invention will become apparent from the following description of a preferred embodiment.

In the drawing:

FIG. 1 is a top plan view of ah bucket of this invention installed in a stall corner.

FIG. 2 is a view in section taken along the line 2—2 in FIG. 1.

FIG. 3 is a view in section taken along the line 3—3 in FIG. 2.

FIG. 4 is a fragmentary view in side elevation of the bail attachment to the bucket or pail of FIG. 1.

FIG. 5 is a view in section taken along the line 5—5 in FIG. 4.

FIG. 6 is a bottom view of the attachment of the bail to the pail.

FIG. 7 is a plan view of the bail alone, reduced in scale.

The drawings show a bucket or pail 10 embodying the principles of the invention and preferably made out of strong plastic, such as polyethylene. Preferably, the pail 10 is molded in one piece without seams for durability and smoothness. The pail 10 has a generally flat bottom wall 11 and a side wall composed of two main portions: a generally semicircular portion 12 and two mutually perpendicular flat walls 13 and 14 which meet at a rounded corner 15. The pail has a rim 16 with a down-turned lip 17, which is provided with two diametrically opposite receptacles 18 and 19 for the reception of suitable ends of a bail 20.

The pail 10 is balanced in its structure so that substantially an equal area lies on each side of the diametrical line extending between the bail receptacles 18 and 19. On one side of this line is the generally semicircular wall 12, and on the other side are the two converging walls 13 and 14, a portion of the semicircular wall 12 extending beyond the bail line enough to provide balance.

The semicircular wall 12 is molded to provide a pouring spout 21 formed by an outwardly extending trough-like portion halfway along the wall 12. The spout 21 enables water or milk to be poured freely from that side, in line with the midpoint of the bail 20. On the other side, a second pouring spout is provided by the corner 15. A short shelf 22 is provided at the corner 15. The bottom wall 11 is provided with two shallow finger grooves 8 and 9 on the lower surface thereof (showing as bumps on the upper surface), one adjacent each spout 15 and 21 and perpendicular to the line connecting the spouts 15 and 21. These finger grooves 8 and 9 help in pouring, the user holding the bail 20 in one hand and putting fingers of the other hand in the groove 8 or 9 on the opposite side of the pail from the spout being used, giving either right-hand or left-hand pouring at all times. The grooves 8 and 9 may be about two inches long and one-half inch wide.

Along the top of the straight walls 13 and 14, the rim 16 not only serves to protect the horse from sharp edges but also provides a rest or support when the pail 10 is installed in the corner of a horse's or calf's stall, engaging a 2″ x 2″ or 2″ x 4″ 30 and 31 or an angle iron. To balance the bucket 10 and assure its support, it is preferable to provide an opening 23 in the shelf 22 through which the stockman or horseowner can install a washer and bolt 24; the bolt 24 is secured to the bucket 10 and extends down vertically from the rim into a drilled hole 25 in the corner supporting structure of the stall. The hole 25 is essentially the same size or only slightly larger than the bolt 24, and this stabilizes the bucket 10 when it is installed in a stall corner. The bucket 10 is provided with an integral grommet 26 at this point. No nut need be attached to the lower end of the bolt 24, so the unit can be removed quickly.

In addition, the stockman may provide two 90° angle lag screws 27 and 28 permanently secured into the 2″ x 2″ or 2″ x 4″ 30 and 31 about three inches from the stall corner 32. These 90° angle lag screws are turned so that their heads are parallel to their respective 2″ x 2″ or 2″ x 4″ 30 or 31 when not in use or when installing or removing a pair, and are turned perpendicularly across the rim 16 of the pail 10 and across the bail 20 when it is desired to clamp the pail down. This assures quick sturdy placement of the bucket 10. When so installed, the pail is flush to the walls and to the corner and is out-of-the-way where it cannot be dumped or spilled and where it will not rattle or roll. Being firmly mounted to an out-of-the-way corner, it is quiet and does not frighten the horses. It takes up less room in the stall and does not dent, split or injure horses with jagged edges, because of being made of strong plastic material with curved edges as shown. When installed, it looks like an integral meaningful part of the stall equipment, not simply a bucket brought in from outside, for it fits snugly and firmly into its corner, usually being balanced in appearance by a feeding tub as in my U.S. Patent No. 3,205,-861, which fits in an adjacent corner or in the opposite corner.

By balancing the volumes of the bucket 10 on the opposite sides of the line joining the bail receptacles 18 and 19, the pail handles perfectly. The flat, squared-off sides 13 and 14 enable two such buckets to be carried in one hand, with the two flat sides 13 and 14 up against each other, whereas round buckets are almost impossible to carry two-in-each-hand and still keep the water level even.

The single grommet hole 23 and single bolt 24 mean that the bucket 10 can simply be dropped into the corner mount and as readily pulled out for twice-daily filling. There is no need for it to be firmly mounted (as is a feed tub) because feed is usually brought to the tub, whereas the bucket is normally taken to the water.

The bail 20 itself and its attachment are unique. Instead of going through ears in the pail, the rim 16 is provided with a pair of slots 35, at the side of each receptacle 18 and 19. The rim 16 is raised to provide the receptacle with a semicircular wall. There is no piece of metal on the receptacle. The bail 20 is provided with a pair of journaled cylindrical bearing members 36, preferably rotatably mounted on the bail ends. A little bent-out swail 37 may be provided in the center of the bail 20 to go over a hook, where desired, and help to center the bail 20 on the hook.

When transporting horses or other livestock by trailer, the bucket 10 is easily mounted up in front of the trailer and can be used for either feed or water; so two buckets are normally used. Most of the horses in a trailer eat off the shelf in front of them and make quite a mess, but with the bucket 10 installed, things are kept more orderly. Moreover, the animal can thereby be given a feeding or watering unit identical to what is is used to in its regular stall. The horseman heretofore has had to reach up in a little window on the side of the trailer, and this has been difficult. But the small bucket 10 with its flat sides 13 and 14 fits snugly up to the wall; so handling is easy, and the horse also finds it very convenient for his uses.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A plastic pail molded to provide a bottom, a side wall, and a top rim, said rim having bail-receiving receptacles diametrically opposite each other and dividing sad pail into two halves of equal volume on opposite sides of the diameter connecting said receptacles, the side wall on one side of said diameter being generally semi-circular with a trough-like pouring spout centrally located along said semicircle, the side wall on the other side of said diameter being generally triangular and comprising two generally-flat mutually perpendicular sides extending from the semicircular portion and providing another pouring spout at the apex of the triangle, and a bail having ends rotatably mounted into said receptacles and extending over said bucket in approximately a semi-circle of about the same diameter as said rim.

2. The pail of claim 1 wherein said rim provides a smooth upper surface and a downturned lip.

3. The pail of claim 1 wherein there is a shelf portion adjacent the rim at said corner and a vertically extending bolt secured to said rim at said shelf and extending downwardly from said rim, the rim above each said planar side also providing a support for engagement by side boards in the corner of a horse stall.

4. The pail of claim 1 having its bail provided with two cylindrical bearings in said receptacles, said receptacles having semicylindrical upper walls.

5. The pail of claim 1 wherein said bottom wall is provided with a pair of finger receiving recesses, one on each side of center along a line connecting the two said pouring spouts.

6. A plastic pail molded in one piece to provide a substantially flat bottom wall, a side wall, and a top rim, said rim having bail-receiving receptacles diametrically opposite each other with the diametral line joining them dividing said pail into two halves of equal volume, the side wall on one said half being semicircular, the side wall on the other said half being generally triangular and comprising two flat mutually perpendicular sides extending from the semicircular portion, and a bail having ends rotatably mounted in said receptacles.

7. The pail of claim 6 wherein said rim provides a smooth upper surface and a downturned outer lip with a flat lower edge, the rim above each said flat side wall providing support means for said pail for engagement by two perpendicular horizontal members meeting at a corner.

8. The pail of claim 7 wherein there is a shelf portion adjacent the rim at said corner having an opening for reception of a vertically extending bolt.

9. The pail of claim 6 wherein said receptacles have semicylindrical upper walls and said bail is semicircular and is provided with two cylindrical bearings fitting in said receptacles.

10. The pail of claim 6 wherein there are two pouring spouts along said top rim, at opposite ends of a second line perpendicular to said diametral line, and a pair of finger-receiving recesses in said bottom wall, one adjacent each said spout, each lying perpendicular to said second line.

11. A plastic pail molded in one piece to provide a bottom wall, a side wall, and a top rim, said rim having bail-receiving receptacles diametrically opposite each other and dividing said pail into two halves of equal volume on opposite sides of the diameter connecting said receptacles, the side wall on one said side generally semicircular and approximately cylindrical with a flare outward and upward and with a trough-like pouring spout centrally located along said semicircle, the other half having said side wall defining two generally planar sides meeting at substantially a right angle and providing a second pouring spout at the vertex, the rim adjacent the vertex being provided with a vertically extended bolt secured to said rim and etxending downwardly from said rim, the rim above each said planar side providing a support for engagement by side boards in a corner stall, and a bail having ends locked rotatably into each said receptacle and extending over said bucket in approximately a semicircle of about the same diameter as said rim.

References Cited
UNITED STATES PATENTS

| | | | |
|---|---|---|---|
| 1,873,624 | 8/1932 | Moxey | 222—465 |
| 2,610,490 | 9/1952 | Tupper | 158—48 X |

ROBERT B. REEVES, *Primary Examiner.*

STANLEY H. TOLLBERG, *Examiner.*